United States Patent
Watson et al.

(10) Patent No.: US 6,477,009 B1
(45) Date of Patent: Nov. 5, 2002

(54) READ MODULE WITH HYBIRD CLOSURE

(75) Inventors: Mark L. Watson, Louisville, CO (US); Richard W. Crowell, Broomfield, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/354,764

(22) Filed: Jul. 29, 1999

(51) Int. Cl.$^7$ .................................................. G11B 5/10
(52) U.S. Cl. ........................................................ 360/128
(58) Field of Search .............................. 360/128, 316, 360/121, 319

(56) References Cited

U.S. PATENT DOCUMENTS

| | | |
|---|---|---|
| 5,032,945 A | 7/1991 | Argyle et al. |
| 5,057,957 A | 10/1991 | Ito et al. |
| 5,142,768 A | 9/1992 | Aboaf et al. |
| 5,212,611 A * | 5/1993 | Dee ........................... 360/113 |
| 5,229,904 A | 7/1993 | Ito et al. |
| 5,296,993 A | 3/1994 | Aboaf et al. |
| 5,331,728 A | 7/1994 | Argyle et al. |
| 5,345,354 A | 9/1994 | Ito et al. |
| 5,388,019 A | 2/1995 | Argyle et al. |
| 5,546,650 A | 8/1996 | Dee |
| 5,594,608 A | 1/1997 | Dee |
| 5,710,683 A | 1/1998 | Sundaram |

* cited by examiner

Primary Examiner—George J. Letscher
(74) Attorney, Agent, or Firm—Brooks & Kushman P.C.

(57) ABSTRACT

A multi-track read module including a hybrid thin film and mechanically closed shield includes a bottom shield layer onto which read elements are formed. A top shield is deposited over each read element. Each top shield is magnetically isolated from any other top shield and from the bottom shield layer. An insulative spacer layer is deposited between the plurality of top shields. A mechanical closure is affixed to the spacer layer.

9 Claims, 2 Drawing Sheets

READ MODULE WITH HYBIRD CLOSURE

TECHNICAL FIELD

The present invention relates to multi-track read heads for accessing magnetic media.

BACKGROUND ART

Multi-track magnetic media access heads, such as tape heads, typically include one or more read modules. Each read module has a plurality of read elements for simultaneously reading data tracks written on the magnetic media. The need for greater areal information density stored on magnetic media has resulted in a narrowing of data track widths, a decrease in spacing between data tracks, and an increase in the linear density of information recorded on each track. These increases in areal information density require improvements in the design of read modules.

Read elements may be inductive or magnetoresistive (MR). MR read sensors may be based on the anisotropic or giant magnetoresistance effects. Anisotropic MR sensors may use a single element or a coupled element structure. An example of a coupled element MR read sensor is provided in U.S. patent application Ser. No. 09/170,330, titled "Dual Element Magnetoresistive Read Head With Integral Element Stabilization" by B. Engel et al., which is herein incorporated by reference. Regardless of the sensor type, read element resolution may be increased by placing magnetic shields on either side of the read element in the direction of tape travel. A magnetically insulative material is placed in the read gap between the read element and each shield. The distance between the read element and the shield, known as the read gap distance, is based on the type of read element, geometry of the read element, type of magnetic media used, and the format of data written onto data tracks. Having symmetric read gap distances is important in coupled element MR sensors, where the read gap distances affect biasing between the element pair.

Two types of shields are used, thin film shields and mechanical closures. Mechanically closed shields are typically a magnetically permeable slab, such as ferrite, which is clamped and glued into place on top of the read element film stack. Mechanical closures are effective and simple to manufacture. However, several difficulties arise. First, the read gap distance is controlled by the ability to correctly attach the closure. Any variation in read gap distance, due to for instance contamination of the closure or substrate, variation in clamping pressure, or deformation of the closure or substrate leading to non-parallelism of the read gap, will detrimentally affect the functionality of the read head. Second, since the closure extends across all read elements in the multi-track module, crosstalk may develop between read elements. Third, mechanically clamping the closure places stress on the read module, which may have an adverse affect on read module operation. Fourth, voids may form between the closure and the read element substrate. These voids may collect debris which may affect the magnetic properties of the tape head and may create electrical shorts.

An alternative to a mechanically closed shield is a thin film shield. Thin film shields are formed by depositing one or more magnetically permeable layers over the read elements. Due to the accuracy of thin film processing, thin film shields produce read gap distances with smaller tolerances than mechanically closed shields. However, the processing steps for a thin film shield module can be complex with the potential for yield reduction in multi-track tape modules.

What is needed is a read module with accurately controlled read gap distances between read elements and shields. The read module should have good wear properties, should not capture debris, and should minimize crosstalk between read elements. A method of easily making such a read module is also desired.

DISCLOSURE OF INVENTION

It is an object of the present invention to provide a multi-track read module with accurate gap distances between read elements and shielding material.

It is another object of the present invention to provide a multi-track read module that is easy to manufacture.

It is still another object of the present invention to provide a read module that minimizes crosstalk between read elements.

It is yet another object of the present invention to provide a multi-track read module with good wear properties.

It is a further object of the present invention to provide a multi-track read module that will not capture debris.

In carrying out the above objects and other objects and features of the present invention, a read module having a plurality of read elements is provided. The read module includes a bottom shield layer. A plurality of read elements is formed on the bottom shield layer. A plurality of top shields is formed as a top shield layer. Each top shield is deposited over one read element. Each top shield is physically isolated from any other top shield and from the bottom shield layer. An insulative spacer layer is deposited between the plurality of top shields. A closure is fixed to the spacer layer.

In an embodiment of the present invention, the spacer layer is thicker than the top shield layer. In a refinement, the spacer layer is approximately ten percent thicker than the top shield layer, thereby providing mechanical support for the closure.

In another embodiment of the present invention, the closure is mechanically attached and glued onto the spacer layer.

A method for manufacturing a read module having a plurality of read elements is also provided. A bottom shield layer is formed. The plurality of read elements is formed on the bottom shield layer. A plurality of top shields is deposited as a top shield layer on the read elements. Each top shield is physically separated from an adjacent top shield by a gap. An insulative spacer layer is deposited on top of the shield layer. The spacer layer substantially fills the gaps between top shields. A closure is bonded to the spacer layer.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
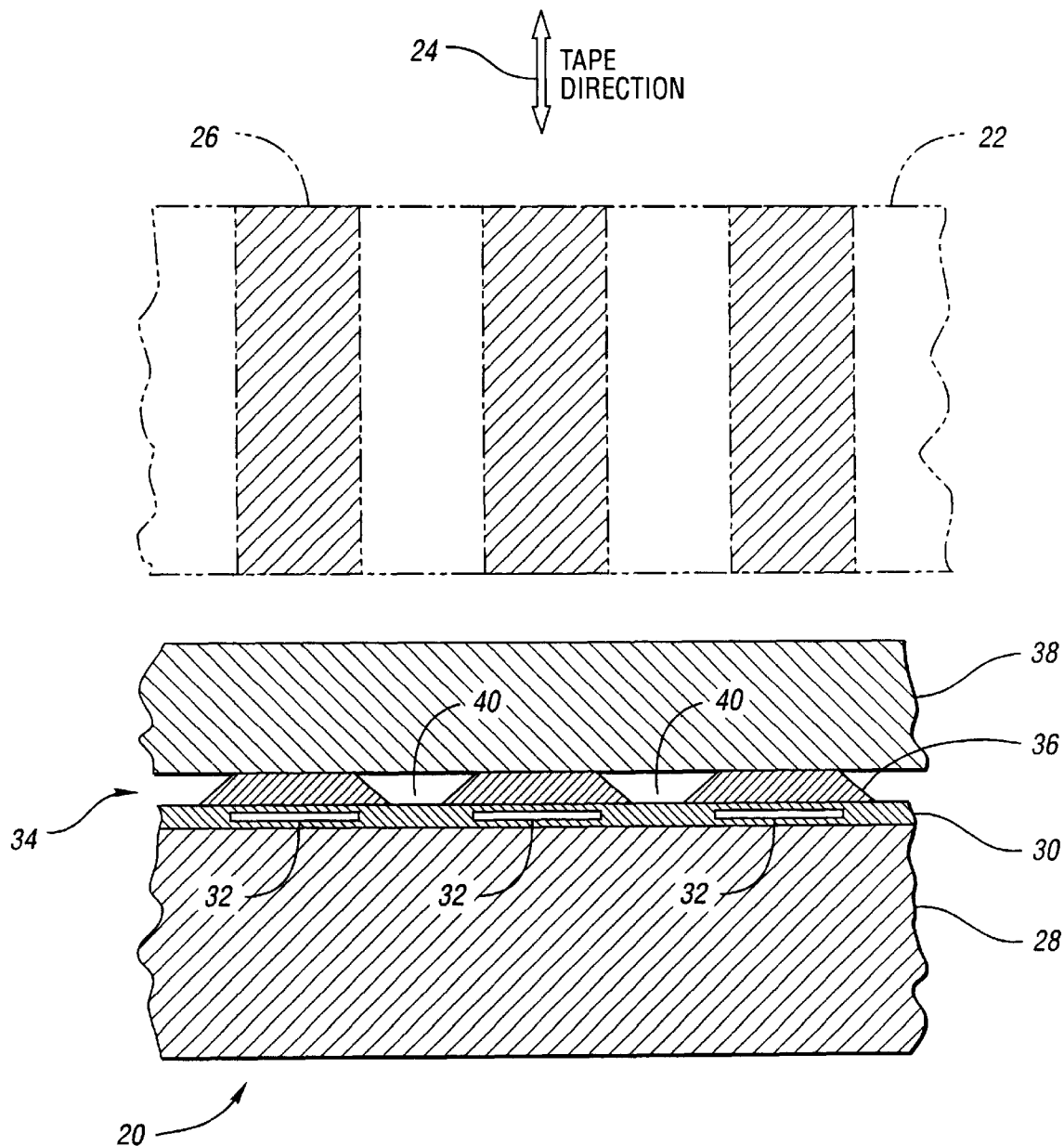
FIG. 1 is a diagram illustrating a hybrid thin film and mechanically closed shield.

Referring to FIG. 1, a diagram illustrating a hybrid thin film and mechanically closed shield is shown. A read module, shown generally by 20, accesses magnetic tape 22 moving past read module 20 in tape direction 24. Tape 22 includes multiple data tracks, one of which is indicated by 26, containing data to be read by read module 20.

Read module 20 includes bottom shield layer 28. Bottom shield layer 28 is a substrate comprising a hard, wear-resistant, ferromagnetic material such as ferrite or a hard, non-magnetic, wear-resistant material such as $Al_2O_3$—TiC. If the latter is used, a high magnetic permeability material, such as alloys based on Ni, Fe, or Co which also have both good wear and corrosion resistance, is deposited on the non-magnetic substrate. Read element stack layer 30 is formed on bottom shield layer 28. Read element stack layer 30 includes a plurality of read elements, indicated schematically by 32, which may be inductive, single element anisotropic MR, coupled element anisotropic MR, giant MR, or the like. Top shield layer 34 is deposited on read element stack layer 30. Top shield layer 34 includes a plurality of top shields, one of which is indicated by 36, with one top shield 36 over each read element 32. Mechanical closure 38, typically comprising a hard, wear-resistant, ferromagnetic material such as ferrite, is mechanically attached and glued to top shield layer 34.

While effective, read module 20 is not wholly satisfactory. One difficulty is that the glue used to hold mechanical closure 38 to top shield layer 34 may not completely fill the voids, one of which is indicated by 40, separating top shields 36. Voids 40 may collect debris from tape 22 and other sources. This debris may change the magnetic properties of read module 20, possibly resulting in crosstalk between read elements 32, short circuits in read element connections, and abrasion of tape 22 passing across read module 20. Another difficulty can result from the contact between magnetically permeable top shields 36 and closure 38. The magnetic paths between shields 36 through closure 38 possibly introduces crosstalk in read elements 32. Still another difficulty is the mechanical stress placed on top shields 36 during the attachment of mechanical closure 38. This stress may adversely affect the operation of read module 20.

Figure 2:
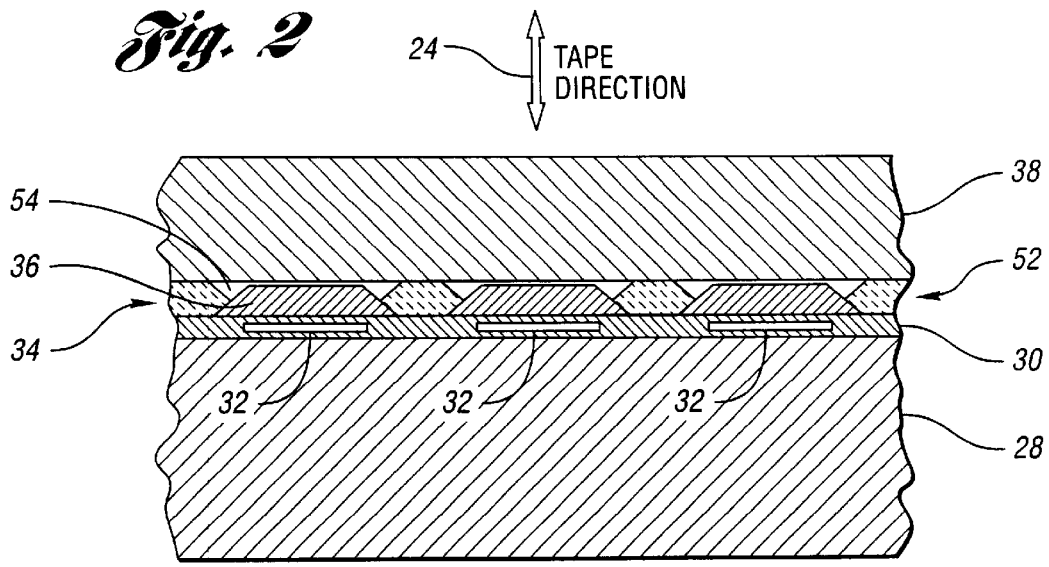
FIG. 2 is a diagram illustrating a hybrid shield with an insulative spacer layer according to an embodiment of the present invention.

Referring now to FIG. 2, a diagram illustrating a hybrid shield with an insulative spacer layer according to an embodiment of the present invention is shown. A read module, indicated generally by 50, is similar in construction and operation to read module 20, with common reference numbers indicating similar elements. Read module 50 includes insulative spacer layer 52 in voids 40 between top shields 36. Insulative spacer layer 52 greatly reduces the size of voids 40 formed in read module 20, thereby permitting glue used to attach mechanical closure 38 to better fill the resulting voids, one of which is indicated by 54.

In a preferred embodiment of the present invention, the thickness of insulative spacer layer 52 is greater than the thickness of top shield layer 34. In a preferred embodiment, insulative spacer layer 52 is approximately ten percent thicker than top shield layer 34. The greater thickness of insulative spacer layer 52 provides several benefits. First, the mechanical stress of clamping and glueing mechanical closure 38 is borne solely by insulative spacer layer 52 and not by top shield layer 34. This greatly reduces mechanical stress on the top shields 36. Second, since mechanical closure 38 is not in physical contact with any top shield 36, crosstalk between read elements 32 may be reduced.

Figure 3:
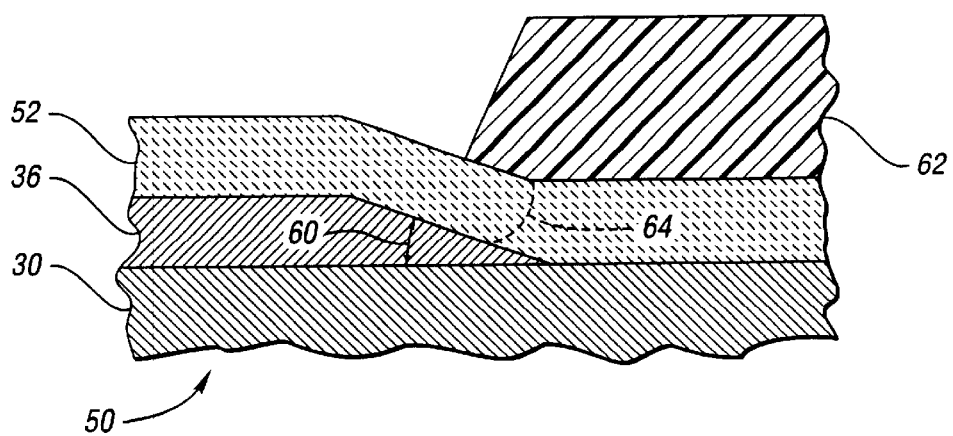
FIG. 3 is a diagram illustrating formation of the insulative spacer layer according to an embodiment of the present invention.

Referring now to FIG. 3, a diagram illustrating formation of the insulative spacer layer according to an embodiment of the present invention is shown. Read element stack layer 30 is first formed on bottom shield layer 28. Typically, a lower insulating gap material, such as $Al_2O_3$ or SiN, is deposited. The lower insulating gap material thickness sets the read gap distance between bottom shield 28 and read elements 32, and is dependent on the read resolution required. This thickness is typically 800 to 2,500 Å. An MR sensor element is deposited and patterned on the lower insulating gap material. The sensor material may include materials that exhibit either an anisotropic or a giant magnetoresistance. In addition, this step may also include deposition and patterning of a soft adjacent layer transverse bias film and permanent magnet or exchange longitudinal stabilization. It may also include steps for depositing and patterning two MR components to provide a dual stripe or coupled element MR sensor. Such a sensor requires an insulating layer between the MR components and any stabilization or domain noise suppression scheme. A low resistivity conductor material, such as Au or Cu, may be deposited and patterned to form conductor leads required to enable electrical connection to read elements 32. An upper insulating gap material is then deposited similar to the lower insulating gap material. It will be recognized by one of ordinary skill in the art that the present invention applies to any type or construction of read elements 32.

Top shield layer 34 defining top shields 36 is deposited. Top shields 36 are made from a high magnetic permeability material, such as alloys based on Ni, Fe, or Co, which may also have both good wear and corrosion resistance. Top shield layer 34 may be deposited by sputtering or electroplating to a thickness in the range of 1 to 4 $\mu$m, typically less than 2 $\mu$m. Top shields 36 are patterned using known photoresist techniques and either wet (chemical) etching or ion milling. The resulting shield wall angle, indicated by 60, is typically 20° to 40° from the horizontal, although both steeper and shallower walls do not significantly affect the design. If necessary, thick, low resistivity conductor studs of material including Cu, Au, or the like, are plated onto conductor leads.

Insulative spacer layer 52 is formed by first depositing planar alumina to cover the entire module structure including top shields 36. In a preferred embodiment of the present invention, insulative spacer layer 52 is adjusted to be very slightly thicker, approximately ten percent, than the thickness of top shield layer 34. A photoresist mask, indicated by 62, is patterned to expose the insulative planar Elm covering top shields 36. The exposed planar film is then removed by either a chemical etch or ion mill process. This is indicated in FIG. 3 by etch line 64. A wet chemical etch of insulative spacer layer 52 results in the removal of insulative spacer layer 52 not covered by photoresist mask 62 as well as an undercut of photoresist mask 62 to etch line 64. Photoresist mask 62 is then removed.

Figure 4:
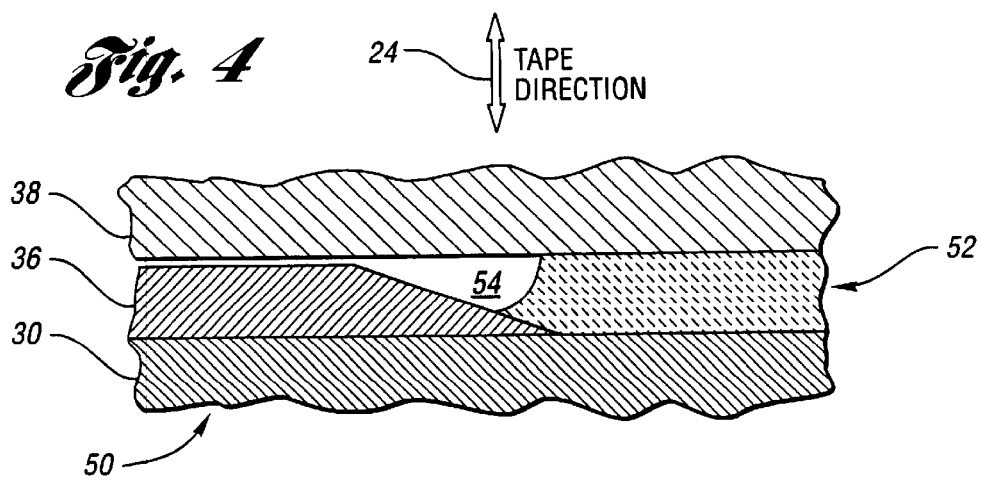
FIG. 4 is a diagram illustrating mechanical closure according to an embodiment of the present invention.

Referring now to FIG. 4, a diagram illustrating mechanical closure according to an embodiment of the present invention is shown. Mechanical closure 38 is then glued and clamped to insulative spacer layer 52. The resulting voids 54 are considerably smaller due to the addition of insulative spacer layer 52 between top shields 36.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A read module having a plurality of read elements comprising:
    a bottom shield layer;
    a plurality of read elements formed on the bottom shield layer;
    a plurality of thin film top shields formed as a top shield layer, each top shield deposited over one read element, each top shield physically isolated from any other top shield and from the bottom shield layer whereby smaller read gap tolerances are formed than by mechanically closed shields;
    a thin film insulative spacer layer deposited between the plurality of top shields; and
    a closure affixed to the spacer layer.

2. A read module as in claim 1 wherein the spacer layer is thicker than the top shield layer.

3. A read module as in claim 2 wherein the spacer layer is approximately 10 percent thicker than the top shield layer, thereby providing mechanical support for the closure.

4. A read module as in claim 3 wherein the closure is mechanically attached and glued onto the spacer layer.

5. A read module comprising a plurality of read elements formed on a bottom shield layer, each read element covered by a thin film top shield physically isolated from the bottom shield layer, each top shield separated from each adjacent top shield by a thin film insulative spacer layer thicker than the separated top shields whereby smaller read gap tolerances are formed than by mechanically closed shields.

6. A read module as in claim 5 further comprising a closure bonded to the spacer layer.

7. A method for manufacturing a read module having a plurality of read elements comprising:
    forming a bottom shield layer;
    forming the plurality of read elements on the bottom shield layer;
    depositing a plurality of thin film top shields as a top shield layer on the read elements, each top shield physically separated from an adjacent top shield by a gap whereby smaller read gap tolerances are formed than by mechanically closed shields;
    depositing a thin film insulative spacer layer on the top shield layer, the spacer layer substantially filling the gaps between top shields; and
    bonding a closure to the spacer layer.

8. A method for manufacturing a read module as in claim 7 wherein the spacer layer is deposited to a thickness greater than the thickness of the top shield layer.

9. A method for manufacturing a read module as in claim 8 wherein the spacer layer is approximately 10 percent thicker than the top shield layer.

* * * * *